June 11, 1929.  J. E. THORNTON  1,716,990
SPOOL CASE FOR CINEMATOGRAPH AND OPTICAL PROJECTION APPARATUS
Filed Jan. 13, 1927   2 Sheets-Sheet 1
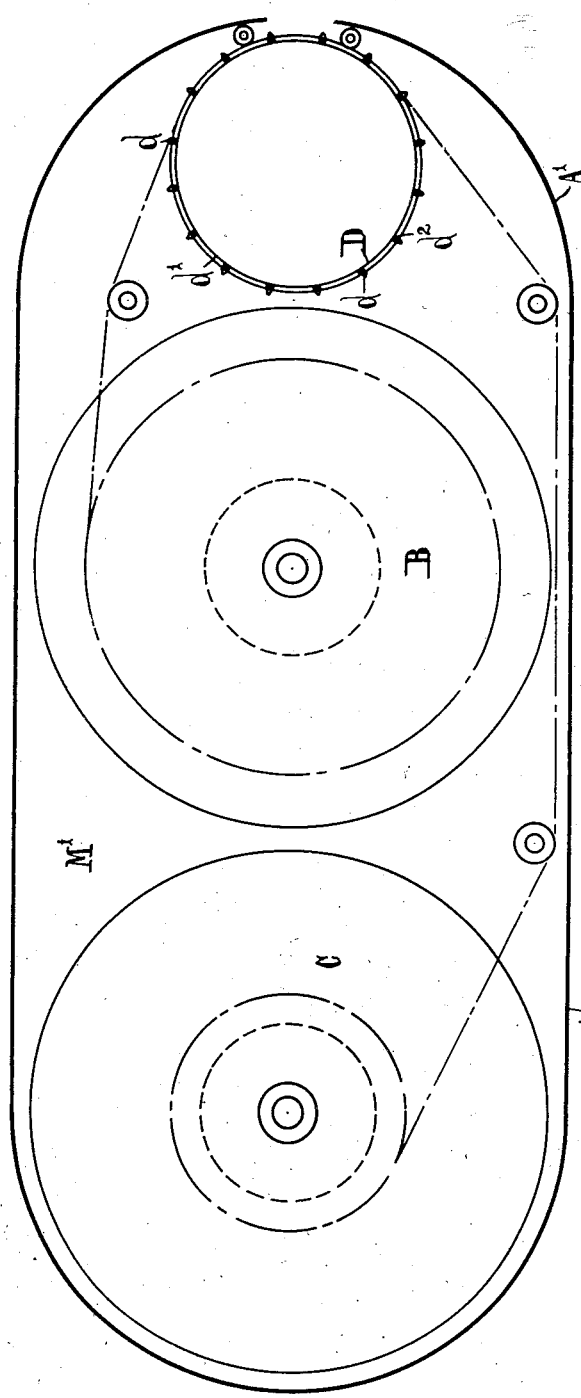
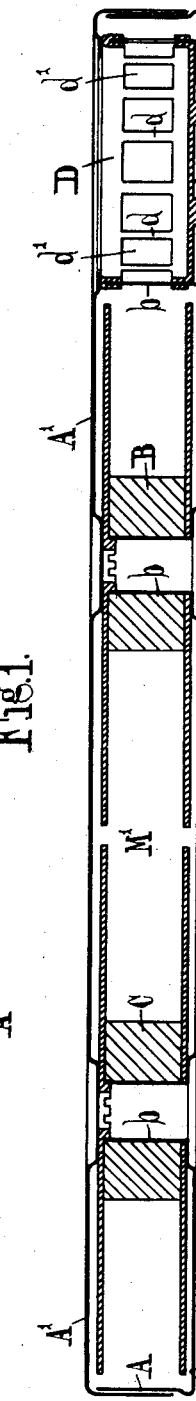
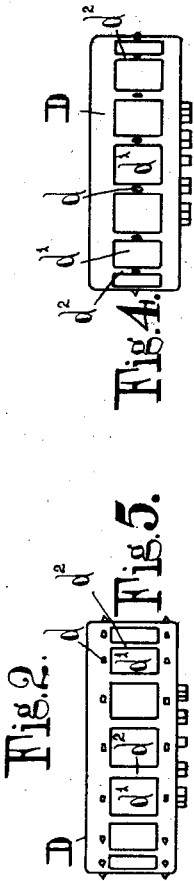
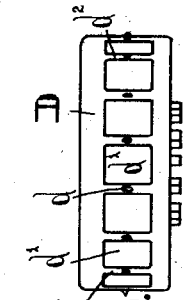

June 11, 1929. J. E. THORNTON 1,716,990
SPOOL CASE FOR CINEMATOGRAPH AND OPTICAL PROJECTION APPARATUS
Filed Jan. 13, 1927 2 Sheets-Sheet 2
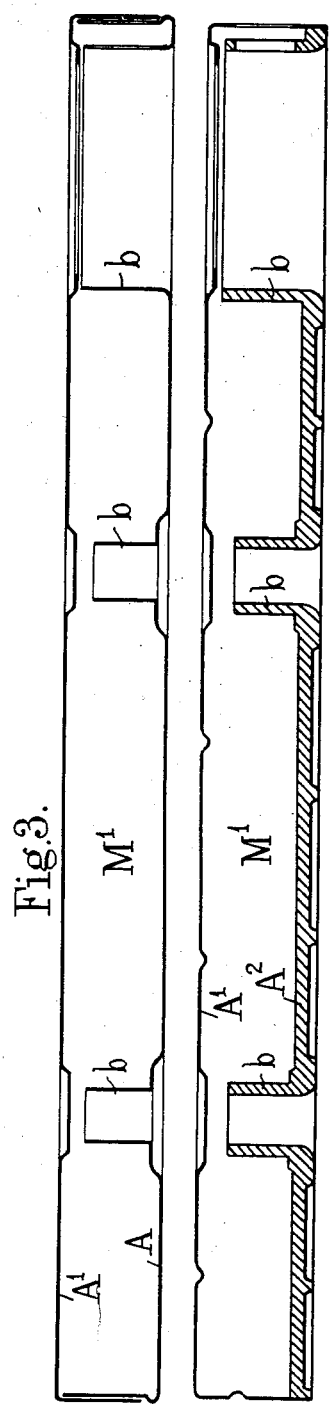
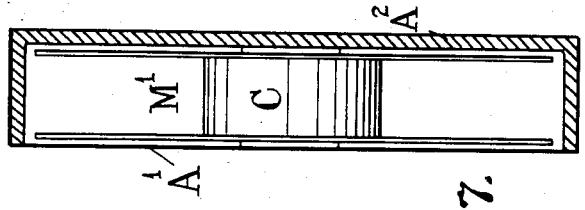
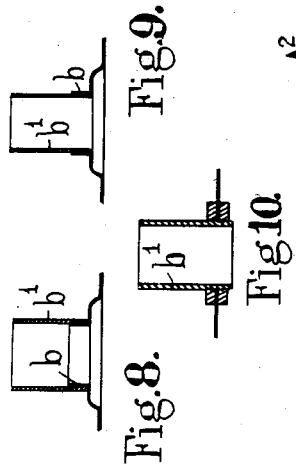
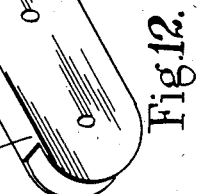
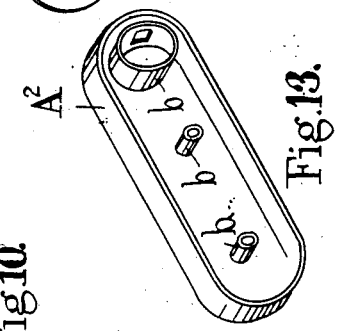

Patented June 11, 1929.

1,716,990

UNITED STATES PATENT OFFICE.

JOHN EDWARD THORNTON, OF WEST HAMPSTEAD, LONDON, ENGLAND, ASSIGNOR TO JOHN OWDEN O'BRIEN, OF MANCHESTER, ENGLAND.

SPOOL CASE FOR CINEMATOGRAPH AND OPTICAL PROJECTION APPARATUS.

Application filed January 13, 1927, Serial No. 160,962, and in Great Britain January 28, 1926.

This invention relates to spoolcases for projection apparatus using transparent film, and may be used with either the cinematograph (motion picture) form of film or the stationary picture (lantern-slide) form of film. In both types the pictures are printed in series successively upon the film ribbon, but in the case of cinematograph pictures they are exhibited at the rate of 16 per second automatically, whilst in the case of stationary pictures each one is allowed to remain visible on the screen for any length of time desired and is changed by the operator moving the ribbon one step or picture at a time by means of a handle or finger lever.

The spoolcase forming the subject of this invention is loaded with picture film at the factory or place of origin, and is then and there sealed by some suitable form of concealed lock, screw, rivet, or other device inaccessible to the general public. It is intended to serve the following varied purposes:—(1) as a storage case to contain the film during storage and transit; (2) as a fireproof safe or container to protect the film from fire during exhibition, transit, or storage; and as a container that will allow the film to be re-wound after exhibition from the receiving-reel back on to the original supply-spool ready for another exhibition; (3) as a carrier or container which can be placed directly into position in the projector for exhibition purposes in exactly the same condition as received from storage or transit; (4) as a film-containing case or package which, when dropped into position in the projector, instantaneously engages with the driving mechanism thereof in such manner that the projector and film-case become to all intents and purposes one machine, thus bringing the movement of both the film and the mechanism enclosed in the locked spoolcase indirectly under the control and accurate automatic positioning of the projector mechanism; and (5) as a detachable film-case or package which can be instantaneously removed from the projector, again leaving the spoolcase and projector two entirely independent and separate pieces of mechanism.

The above described features are secured at the same time as the following advantage of great commercial utility, which is absent from previous known forms of spoolcase intended for use in projectors. Hitherto it has always been necessary for the operator to adjust either the film or mechanism, or both, before the film could be brought into operative control with the projector. In the unskilled hands of the general public this operation frequently resulted in scratching, breaking, or otherwise damaging the delicate film or its perforations, and involved the necessity for some portion of film being left uncovered or passing out of and again into the spoolcase. But in the present invention the film does not pass out of the case at any part of its travel, and the operator is never called upon to touch the film or to make any adjustments. The film always remains inside its enclosing spoolcase, and the latter may be almost tumbled or thrown into position in the projector whereupon it automatically and instantaneously engages with the driving mechanism and the film automatically becomes correctly positioned. Nor is it necessary to first wind or rewind the film to either the beginning or end of its travel. Instantaneous engagement and accurate picture-positioning is effected at any part of the film's travel, whenever the spoolcase is placed in the projector.

This spoolcase is intended to be used in conjunction with the particular type of projector forming the subject of a concurrent application, Serial No. 160,963, filed January 13, 1927.

According to the invention the spoolcase comprises in its construction a rotating toothed hollow film-measuring and positioning drum, a film supply spool, a film receiving reel and an enclosing case in or upon which the other parts are mounted and carried, the enclosing case being sealed or fastened so that its contents are inaccessible and is adapted with its contents for insertion in a projector to connect up with the driving mechanism, lighting and optical system of the projectors.

The invention is illustrated in the accompanying drawings in which:—

Fig. 1 is a side elevation with part of the cover removed of one form of the invention.

Fig. 2 is a transverse section of same.

Fig. 3 is a transverse section with the spool and reel removed.

Figs. 4 and 5 show different constructions of feed drums.

Fig. 6 shows the end of one of the spindles on the projector for driving the spool or reel.

Fig. 7 is a transverse section through a modified form of casing.

Figs. 8, 9 and 10 show different ways of constructing the tubular members upon which the spool and reel are mounted.

Fig. 11 shows a section through a moulded casing.

Figs. 12 and 13 are perspective views of the two parts of a modified form of the casing in which one part is adapted to slide itno the other part.

The spool case comprises a shallow rectangular case with rounded ends, and in the form shown in Figs. 1 and 2 is constructed of two portions, A, $A^1$ like a telescopic box and lid which fit one within the other. For low cost, strength, and speed of production it is preferred to construct it of stainless steel or thin sheet iron or aluminium-alloy, further stiffness when using exceedingly thin metal being secured by forming ribs or corrugations in various directions in the sides, top, bottom, and ends of the sections.

The spoolcase $M^1$ contains a supply-spool B, a receiving-reel C, and a measuring-drum D. These several parts rotate upon tubular pillars or sleeves $b$ which are stamped up from or drawn out from the material composing the thin metal sides of the case as shown in Fig. 2. Should there be insufficient metal obtainable from the drawing of one side to make sleeves of sufficient length, they may be lengthened by the addition of separate tubes $b^1$ welded or otherwise secured to the shorter lengths $b$. Or the sleeves may all be made of separated tubes each with a flange which can be screwed, riveted or brazed on to the wall of the case, see Figs. 8 or 9 and 10.

Or the case may be cast or moulded as shown in Fig. 2 instead of stamped, in which form the tubular pillars would be cast in one piece with the side or sides and afterwards machined to make them truly accurate. Die-castings may be used if preferred.

In another alternative construction shown in Fig. 7 the rotating parts B, C and D and their pillars $b$ are supported by a strong metal frame $A^2$, such as an aluminium stamping or casting, the whole being provided with a cover $A^1$ of aluminium or tin-plate or enclosed in an outer case formed of two aluminium or tin-plate enclosing lids.

Or the frame $A^2$ may be formed with rounded ends as shown in Figs. 12 and 13, and pushed, after loading, into a flat tube $A^3$ which surrounds and encloses the working parts, its two ends being enclosed and completed by the two rounded ends of the inner frame.

In cases made otherwise than stamped they may be cast, moulded, or die-cast; any light, cheap material or combination of materials may be used, such as aluminium, vulcanite, non-inflammable cellulose, papier-mâché, or other composition. But any strong and rigid moulded case will be heavier than one stamped and corrugated as described from very thin sheet metal.

As previously stated the case contains a film delivery-spool B, a film receiving-reel C and a perforated hollow sprocket or film measuring-drum D; the function of this perforated drum being to pull and feed the film forward, bring it to rest for exhibition, accurately position it during exhibition, change and shift the picture after exhibition (simultaneously pulling and feeding another picture to take its place), and finally to pass on and deliver the film after exhibition to the receiving reel.

The drum D is provided with teeth $d$ to engage the film. These teeth $d$ may be arranged in any desired way but are preferably arranged with a single tooth between each picture space as shown in Fig. 4 or with two teeth at each side of each picture space as shown in Fig. 5.

The spool B and reel C are preferably constructed as described in the specification of Patent No. 1,655,299, dated January 3, 1928, and the films or film leader strips are attached to the central cores in the manner described in the said specification. The central cores are preferably made from wood having the pores filled with wax to obviate the necessity for lubrication which is very undesirable.

The central hole of each spool and reel core is provided with a simple clutch of any suitable form, to engage with a corresponding part on the driving spindles of the projector, so that when the spool and reel come into engagement with the spindles they will be driven thereby. One form of such clutch as shown in Fig. 2 is a toothed crown wheel formed upon each section; another is a cross-pin on one section to enter a slot in the other section.

The feeding, exhibiting and measuring drum D is preferably constructed as described in the specification of Patent No. 1,654,391, dated December 27, 1927, with picture apertures $d^1$, teeth $d$ to engage the perforations on the film and narrow cross bars $d^2$ between each pair of apertures $d^1$. Any desired number of apertures may be formed in the drum but sixteen is preferred, corresponding to a movement of sixteen pictures per second in one revolution per second of the drum.

The circumference of the film-drum may be circular or it may be provided with flat portions, one flat for each picture, small rollers being provided at each side of the apparatus to keep the film in contact with the drum.

By forming sixteen teeth on the crown wheel carried by this intermittent maltese wheel, and either an equal number on the film-drum (or alternatively a single tooth on the film-drum), it becomes possible to place the film spool in position in the projector at any point, and yet to insure that every picture will automatically centre and correctly position without adjustment by the operator.

The drum is mounted in a similar manner to that adopted for the spool and reel, so that it may freely rotate in or upon a large tubular pillar or sleeve stamped or drawn from the case, the front being perforated with one aperture the size of one picture. This sleeve also serves the further purpose of a lamp house, into which the lamp or prism or mirror reflecting the light of the lamp attached to the projector may easily fit.

With small size film the film-drum forms the equivalent of the usual gate, but has the tremendous advantage that it dispenses with all the complications and troubles ensuing from the use of the usual type of spring pressure gate. The film is held in contact with the drum by two small guide rolls.

The front end of the spoolcase is provided with an exposure aperture through which the picture becomes visible. In one form of projector the light is projected from behind the aperture through a lens placed in front of this aperture; whilst in another form the order is reversed, the light being placed in front.

I claim:

1. Film carrying apparatus for cinematograph projectors comprising a casing, two sleeves stamped from one side of the casing to project thereinto, a film supplying spool mounted upon one of the sleeves and a receiving reel mounted upon the other sleeve, crown teeth within the hub of the spool and reel to form driving means therefor, a feed drum mounted at one end of the casing in line with the spool and reel and crown teeth projecting through an aperture in the casing on one side of the drum by which said drum is driven.

2. Film carrying apparatus for cinematograph projectors comprising a casing, two sleeves stamped from one side of the casing to project thereinto, a film supply spool mounted upon one of the sleeves and a receiving reel mounted upon the other sleeve, crown teeth within the hub of the spool and reel to form driving means therefor, an apertured feed drum in line with the spool and reel mounted at one end of the casing through which the film is exhibited, crown teeth projecting through an aperture in the casing on one side of the drum by which said drum is driven and guide rollers in the casing to direct the film from the spool to the drum and back to the reel.

In testimony whereof I have hereunto set my hand.

JOHN EDWARD THORNTON.